United States Patent Office 3,444,553
Patented May 13, 1969

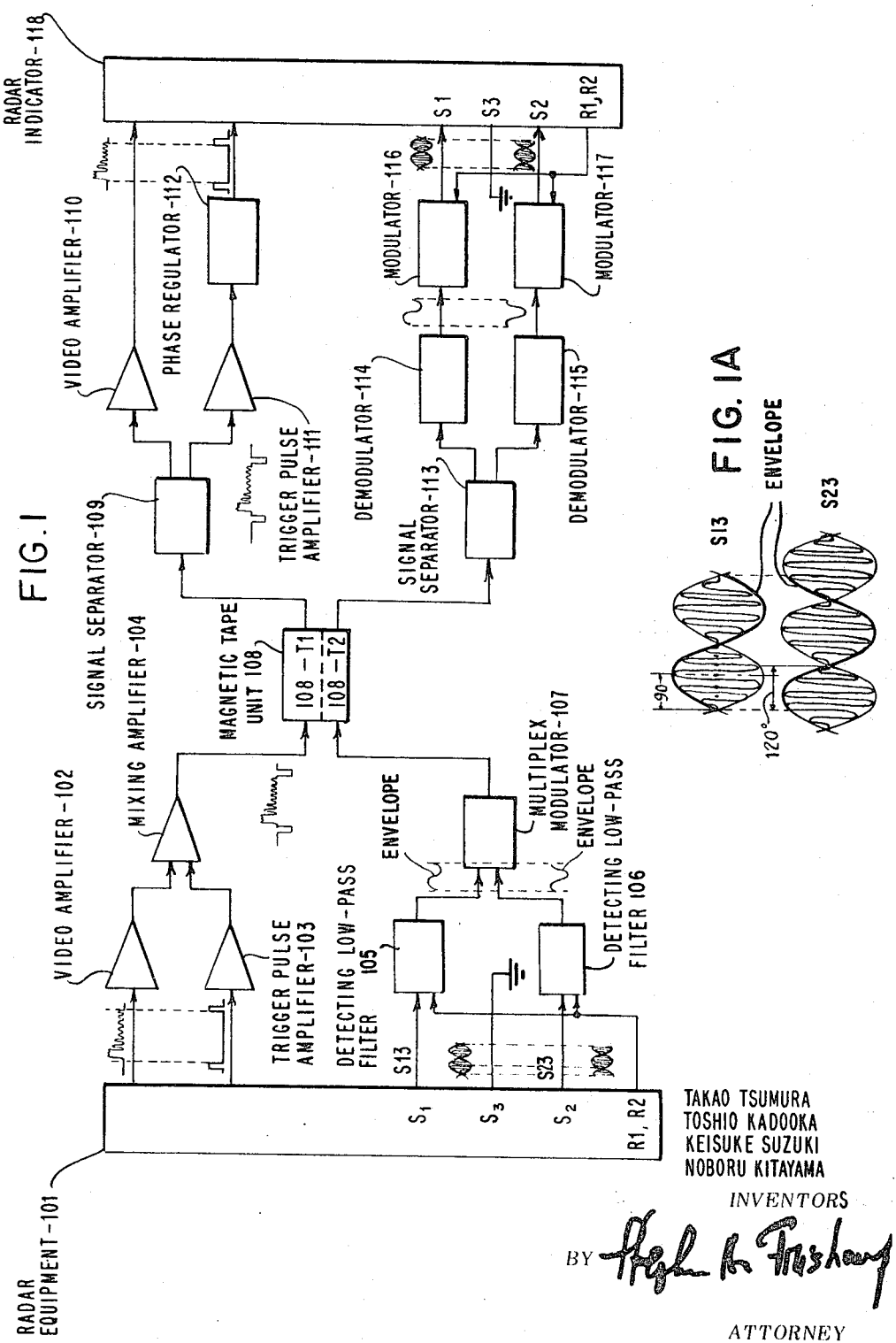

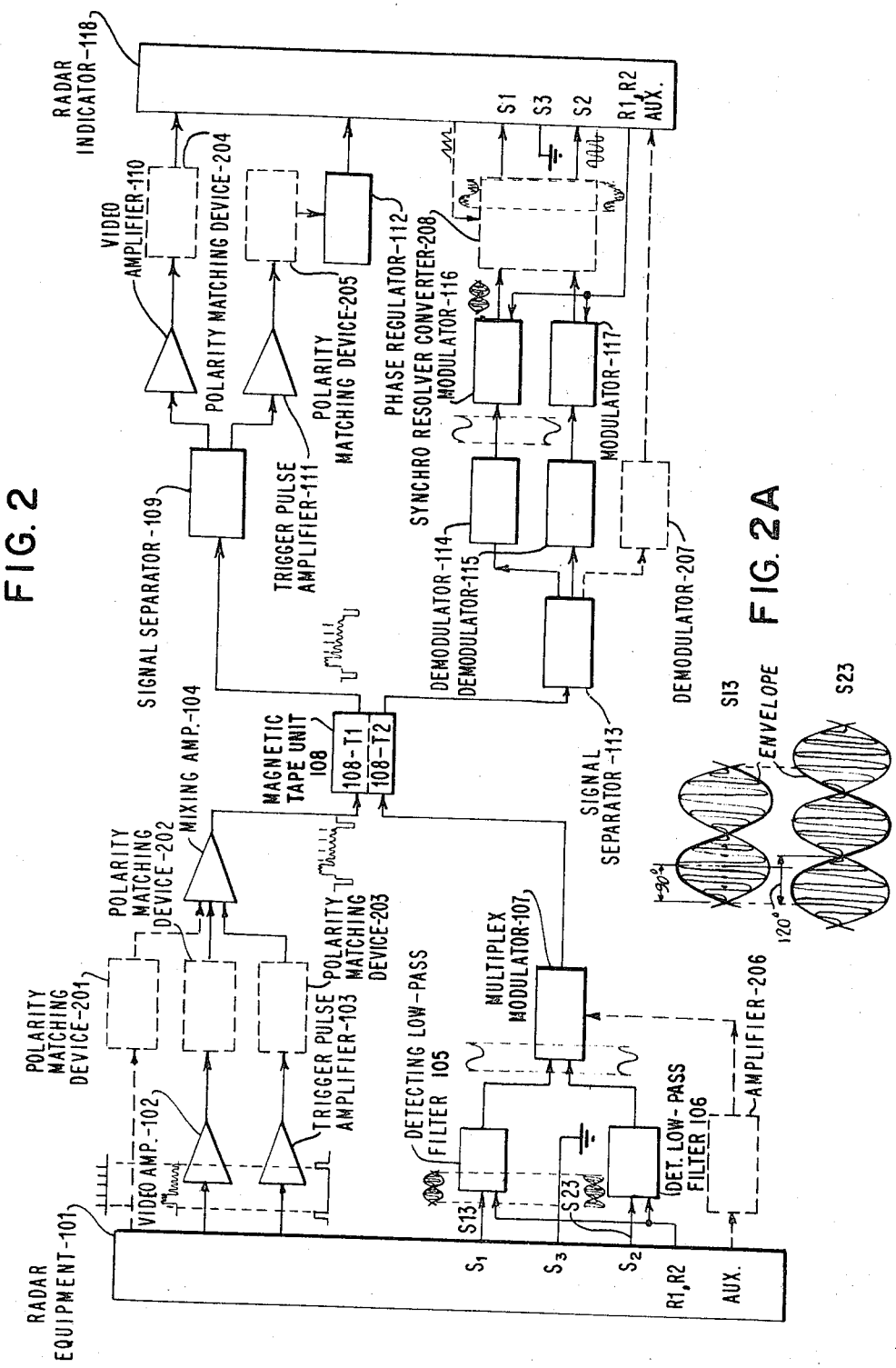

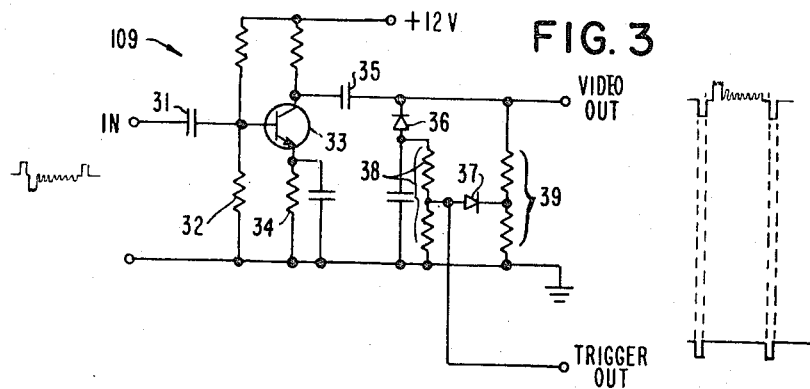
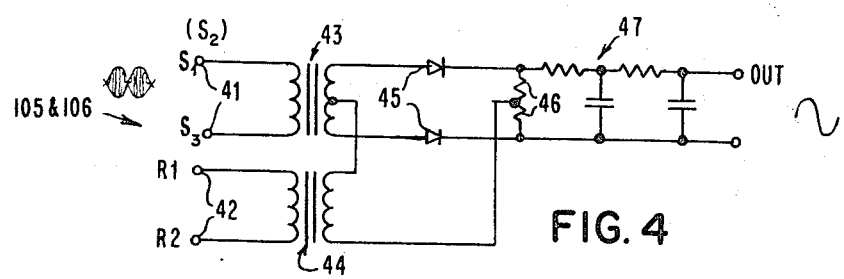
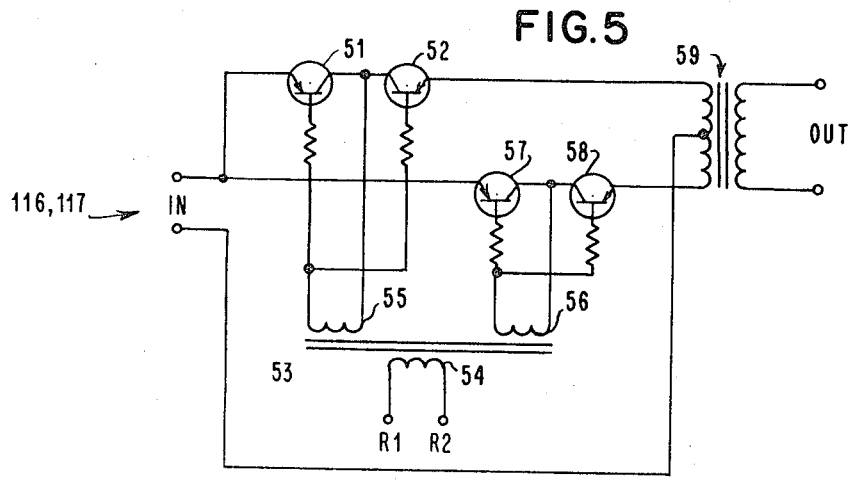

3,444,553
RADAR SIGNAL RECORDING AND REPRODUCING SYSTEM
Takao Tsumura, Toshio Kadooka, Keisuke Suzuki, and Noboru Kitayama, Tokyo, Japan, assignors to Japan Radio Company Limited, Tokyo, Japan, a corporation of Japan
Filed Jan. 31, 1968, Ser. No. 702,108
Claims priority, application Japan, Feb. 3, 1967, 42/6,938
Int. Cl. G01s 9/02
U.S. Cl. 343—5                                11 Claims

ABSTRACT OF THE DISCLOSURE

Polar coordinate information signals, received in the radar receivers are recorded by deriving video signals from a video channel (if desired, in combination with range tracking signals) and mixing these signals with trigger pulses from the receiver, the mixed signals are recorded on one track of a magnetic tape. At least two bearing signals (with respect to a reference, as determined by reference signals) are mixed and recorded, if desired together with other signals such as audio for oral comments, on the other track of the tape. For reproduction, these signals are read separately from their tracks, separated (for example, by filters or similar networks) and then applied to a radar display reproducer.

---

The present invention relates to the recording of radar signals, and more particularly to recording radar signals in polar coordinates and available at output terminals of a radar receiver.

The display obtained from radar receivers has, in the past, been recorded by photographing the radar display, for example, on motion picture film, for later reproduction. Such later reproduction may be desired for training, or accident investigation purposes, for example. Radar and sonar equipment have displays in polar coordinate form; for example the PPI, delayed PPI, off center PPI and the RH display. Photographing, and then projecting a photograph film of radar displays has the disadvantage that the quality and resolution of the image deteriorates due to the additional reproduction step, and complicated conversions are necessary to match the frame rate of standard motion picture equipment and the frame repetition rate of the radar display.

When recording usual television signals, a definite number of vertical and horizontal synchronizing signals are inserted in the video channels, and likewise recorded. When recording radar, or sonar display, or video signals, it is only necessary to record the trigger pulse simultaneously with the video signals. Since, however, synchronizing bearing signals have no relationship to the trigger pulse signals, not all signals can be inserted into a single video signal channel, as in the case of the recording of ordinary television signals.

It is an object of the present invention to provide apparatus capable of directly recording, for later reproduction, polar coordinate data from radar equipment, without resorting to an intermediate photographic film.

Subject matter of the present invention

Video signals from radar equipment, as well as synchronizing trigger pulse signals are amplified and mixed and recorded on a first track of a magnetic tape. Further, one of three bearing signals from the radar equipment, indicating the relative position of a scanning antenna, is used as a reference; the other two bearing signals are detected, filtered, amplified and multiplex modulated. Thereafter, these signals are recorded on a second track of the magnetic tape, synchronized with the first track thereon.

For reproduction, the first or video track is read; the read signals are separated, in order to separate the video signals from the trigger pulses. After separation, the signals are fed separately to a video amplifier and to a trigger pulse amplifier and to a phase regulator for reproduction. Simultaneously, the bearing signals are read, separated again from each other by a signal separator and demodulated. The demodulated signals are then supplied to modulators where they are modulated by utilizing, as a carrier, the reference signal used for the bearing signals of the reproducing radar indicator. They are supplied to the bearing signal input of the indicator where the radar video signals are being reproduced.

The quality of the image will not deteriorate as the actual video signal is recorded directly in the form of electrical signals, and no intermediate photographic, or mechanical reproducing step intervenes. Additionally, the construction of the equipment can be quite simple, so that the reproduced pictures will be a faithful reproduction of their original radar display.

The second channel, besides recording (and later reproducing) the bearing signal, may also be used to record and later reproduce additional information; for example, this channel may be used for recording oral instructions from a microphone given, for example, by a ship's deck officer, by an instructor, and the like, during observation of the radar image originally received, and for later use during playback. The equipment is thus versatile, may be used for precise surveying at later times to check on proper use of the radar equipment; for use as an aid in training and instruction, or to provide a later record of radar images, for example, for use in air traffic control. Additionally, the equipment can later show navigation routes used, if installed on shipboard, and will present, for later analysis or for teaching purposes a display similar to track charts useful, for example, when a ship enters a narrow channel so that the record itself could be treated as a log book. One hour's worth of PPI displays, may be recorded along with commentaries on a 10½ inch reel of tape. By stepping the recording, for example of one frame every five minutes, a reel can store radar displays indicating, for example, movement of a ship over a two day period.

The structure, organization, and operation of the invention will now be described more specifically with reference to the accompanying drawings, wherein:

FIGURE 1 is a schematic block diagram of the recording and reproducing system of the present invention;

FIGURE 1A illustrates waveforms useful in the description of the system of FIGURE 1;

FIGURE 2 is a schematic diagram of a modification;

FIGURE 2A illustrates waveforms useful in the description of the system of FIGURE 2;

FIGURE 3 is a schematic circuit diagram of signal separator 109 used in the equipment of the present invention;

FIGURE 4 is a schematic circuit diagram of detecting low-pass filters (i.e., detectors) 105, 106 used in the system; and FIGURE 5 is a schematic circuit diagram of modulators 116, 117 used in the system of the present invention.

Referring now to the drawings, wherein corresponding elements are provided with the same reference numerals; and wave forms arising in the equipment are indicated adjacent the respective lines: radar equipment, generally indicated by block 101, generates video and trigger pulse signals. A video channel, including a video amplifier 102 of standard construction is connected to receive the video signals. A trigger pulse channel, including a trigger pulse amplifier 103 is connected to receive the trigger pulses. The outputs from the trigger pulse channel and the video channel are mixed in a mixing amplifier 104. The output of mixing amplifier 104 is recorded on a magnetic tape unit 108, and specifically on track T1 thereof, indicated in the drawings schematically as T1.

The recorded tape can later, and remotely, be reproduced by a reproducing system. Track 108–T1 is read in the tape equipment 108, and the resulting signal is applied to a signal separator 109, shown in greater detail in FIGURE 3. Signal separator 109 separates out the video signal and the trigger pulse signal. The video signal is applied to a video amplifier 110, which is connected to the video channel of a radar indicator or reproducer of standard construction, indicated schematically by block 118. The trigger pulse signals, separated in signal separator 109 are applied to a trigger pulse amplifier 111 and then to a phase regulator 112, for connection to the trigger pulse input of the radar indicator 118. Phase regulator 112 is needed in order to center the reproduced image on radar indicator 118.

Video amplifier 102 can be a simple amplifier having the proper frequency band width to accommodate video signals. Trigger pulse amplifier 103 may be a simple blocking oscillator circuit, a multivibrator or the like. Mixing amplifier 104 is an ordinary two-input mixer-amplifier circuit well known in the electronics art. Signal separator 109 is shown in greater detail in FIGURE 3. Composite, mixed input signal, derived from mixing amplifier 104 and recorded on magnetic tape, and again read from magnetic tape, is applied to the input shown as IN. An input network consisting of condenser 31 and resistor 32, applies the input to the base of a transistor 33, the collector of which is connected to a source of positive voltage as well known in the art. A feedback resistance 34 is provided to stabilize the circuit. Output is taken from a condenser 35 and applied directly to a video output terminal as indicated. A diode network, and a pair of voltage divider resistances, consisting of diodes 36, 37 and voltage dividers 38, 39, in combination with a condenser connected in parallel to voltage divider 38, filters out the high frequency video signal components and passes only trigger signals of a predetermined polarity. Marker pulse signals, indicated at the video output, can be transmitted, or filtered out by diodes (not shown) and connected in proper polarity in the video output line.

Video amplifier 110 is, again, an ordinary amplifier capable of passing frequencies in the video range. Trigger pulse amplifier 111 may be a blocking oscillator. Phase regulator 112 sets the position of the transmitted pulse at the center of the PPI display. It is thus not necessary to provide a reference signal for the center setting. The circuit of the phase regulator 112, shown only in block form, may be a variable delay circuit, or, for example, a monostable multivibrator, having a variable time constant to permit the operator to adjust the setting of the trigger pulses with respect to the sweep rate of the radar display so that the display will be centered.

Besides the video and trigger pulse signals, bearing signals must be transmitted, in order to indicate the rotating position of the antenna of radar equipment 101. These bearings signals, $S_1$, $S_2$ and $S_3$ are derived from outputs available at radar receivers and having signals thereon representative, with respect to each other, of the position of the antenna of the radar equipment. It is sufficient if two of these signals are used, the third one, signal $S_3$, being grounded. Composite signals, taken across the physical output lines, and indicated as signals $S_{13}$ and $S_{23}$ (FIG. 1A) are applied, one each to a channel of detecting low-pass filters (i.e., detectors) 105, 106. These detectors are shown in greater detail in FIGURE 4. In addition to the inputs $S_{13}$ and $S_{23}$, reference signals $R_1$ and $R_2$ must be applied in order to provide for phase detection in the detecting filters 105, 106. The signals $S_{13}$ and $S_{23}$ are already being modulated in the radar equipment 101 (for example by amplitude modulation, frequency modulation, phase modulation or the like) on a carrier which may itself be the reference signal $R_1$, $R_2$. In detecting filters 105, 106 the inputs $S_{13}$ and $S_{23}$ are phase-detected by using reference signals $R_1$ and $R_2$, and then filtered. As a result, the envelope of the signals $S_{13}$ and $S_{23}$ can be obtained. The two envelope signals are then applied to a multiplex mixer-modulator circuit 107, where they modulate the carriers of 5 kHz. and 8 kHz., for example, separately, and they are multiple mixed and then recorded on track T2 of magnetic tape 108, as indicated in the drawing at 108–T2.

Detecting low-pass filters 105, 106 are seen in FIGURE 4 in greater detail. Input lines 41 connect to lines $S_1$, or $S_2$ on one terminal, and to line $S_3$ on the other. The input is applied to a center tapped transformer 43. Reference signals $R_1$, $R_2$ are applied at input terminals 42 to another transformer 44. One terminal of transformer 44 is connected to the center tap of transformer 43. The other terminal is connected to the center tap of a voltage divider 46, connected over a pair of similarly poled diodes 45 across the terminals of the secondary of transformer 43. A pi filter 47 filters out undesired frequencies. The output, available at the terminals OUT, will then be the envelope of signals $S_1$ and $S_3$ (or $S_2$ and $S_3$, respectively), as phase-detector by $R_1$, $R_2$ applied to terminals 42. The multiplex modulator 107 is not shown in detail; it may consist of, for example, a pair of multivibrator circuits, connected in parallel to a common output through a proper isolation stage to prevent intermodulation of inputs. Other circuits, well known in the art, may also be used.

For playback, track T2 is again read in unit 108 and the resulting signal is applied to a signal separator 113. If the synchronizing signal is an FM signal, and each applied to a separate carrier (that is, the frequencies of $f_1$ and $f_2$ are different) the signals can readily be separated into their components by a band pass filter. The synchronizing frequencies are usually frequencies in the audio range of about 10 kHz. or less. Other modulation systems, such as a time division system or FM-AM systems may be used; separation of the signals into their original components can again be done by means of filters or active networks as known in the art. The separated signals are applied to demodulators 114, 115. If the signals are FM modulated, these circuits may simply be ratio detectors, or other FM detectors. The output of demodulators 114, 115 will be the envelope of the bearing signals $S_{13}$ and $S_{23}$. For use as bearing signals in the reproducing radar indicator 118, only the envelope outputs of the synchro signals are recorded; the frequency and phase of reference signals driving the synchro equipment of radar equipment 101 is not recorded. The frequency and phase of reference signals driving the synchro equipment of radar indicator 118 is inserted at playback. This is extremely convenient, because reinserted reference signals need not be the same frequency and phase as the original reference signals. This means that 50 or 60 Hz. synchro equipment can be used in the radar indicator 118 even though the radar equipment 101 with which the recordings are made uses 400 Hz. synchro equipment, for example. Therefore, the bearing signals are applied to modulators 116, 117, respectively, where the signals are modulated and amplified by employing, as a carrier, the reference signal which is used for the bearing signals in the reproducing radar indicator 118. These reproducer-bearing reference signals are applied from reproducing radar indicator 118 to modulators 116, 117 shown in greater detail in FIGURE 5. After having been modulated, the synchro signals are again applied to terminals $S_1$ and $S_2$ of radar indicator 118, terminal $S_3$ of the radar indicator being grounded.

FIGURE 5 illustrates a typical modulator, 116, 117.

The input is applied, in parallel, to a pair of series connected transistors 51, 52 and 57, 58. Each of the pairs of transistors have their bases connected over a protecting resistance to one terminal of a winding 55, 56 respectively of a transformer 53, the primary winding 54 of which is connected to terminals $R_1$, $R_2$ of radar reproducer 118. The output of the transistor pairs 57, 58 and 51, 52 is connected across the secondary of a transformer 59, a center tap of which connects to the other input terminal. The output is taken across the transformer 59. The operation of the circuit will be clear by its inspection; the input signal, applied through the emitter-collector paths of transistors 51, 52 and 57, 58 will be modified by signals applied to the primary winding 54 of transformer 53. Video signals and other signals from radar equipment 101 are therefore recorded on two tracks $T_1$ and $T_2$ of magnetic unit 108. The displays are read from the two tracks $T_1$ and $T_2$ and will reproduce, faithfully, the original signals from radar receiver equipment 101, for display at a later time or at a different location.

The frequency band for the radar video signals is at least one mHz., for coarse reproduction; for fine, higher resolution reproduction, a band of 10 mHz. may be needed. In actual practice, a frequency band of at least 4 mHz. is necessary. If video tape is used, the video signal can be recorded on the tape transversely, and the frequency band for the bearing signals, and other signals (as will appear below) can then be recorded longitudinally. A frequency range for the bearing signals, and other signals of about 10 kHz. is usually sufficient. Thus, track $T_1$ extends crosswise and track $T_2$ longitudinally, with respect to the direction of travel of the tape. Both tracks are synchronized with each other during reproduction and reading. Of course, track $T_1$ can also be recorded in a slanting direction with respect to tape width. Likewise, bearing signals (track $T_2$) can be recorded transversely as well, requiring only a smaller width than the recording track $T_1$.

FIGURE 2 shows a modified form of the present invention. The elements having the same reference numeral as in FIGURE 1 are identical. In addition, the system of FIGURE 2 includes polarity matching devices 201, 202, 203 in order to provide conversion to desired polarity if the polarity of the video signal and the trigger pulse-signal varies with the equipment to which the recording-reproducing unit of the present invention is to be used. In other words, if the recording-reproducing unit for radar signals, in accordance with the present invention, is intended for use with radar equipment and radar indicators in which the polarity of the video signals and the trigger pulses is always the same, then the polarity matching devices 201, 202, 203 are not needed; for universal application, however, polarity matching devices 202, 203 convert the video signals and trigger pulse signals to signals of proper polarity. If range marker signals are likewise used, polarity matching device 201 converts the range markers to proper polarity, and inserts the so-converted marker signals into the mixing amplifier 104 for subsequent recording, as explained in connection with FIGURE 1.

For play-back, polarity matching devices 204, 205 are provided, connected as shown in order to match the polarity of the output signals to the particular polarity required by radar indicator 118.

An additional modification of the equipment may be made in the range channels. Additional signals, marked AUX, may be applied to an amplifier 206, which signals are multiplex-mixed in modulator 107. These signals may be, for example, audio signals, for example, spoken commentaries by instructors, range officers and the like. They may also contain height signals, additional range signals or timing signals, or other control signals. For reproduction, these additional signals separated again in signal separator 113, demodulated in a demodulator 207 are applied to the auxiliary input of radar indicator 118, marked AUX.

When radar equipment 101 has an indicator of the resolver-type, sawtooth waves generated as bearing signals by the indicator of the radar equipment can be directly distributed into X- and Y-components and the like by a synchro resolver. Therefore, if a synchro resolver indicator is used as a reproducing indicator, a resolver-converter 208 is inserted in the circuit, receiving the output of modulators 116, 117 to convert the signals to synchro-resolver type signals for application to the radar indicator.

The additional signals from terminal AUX may, for example, be height signals. Such signals are components of DC, or AC voltages, indicating the height of the indicator of the radar system providing a RH scope display. Their variation is slow. A range signal is the range component in case the system is used in a sonar system, making a spiral display, the signal being representative of the range as the spiral proceeds from the center of the cathode ray tube. A timing signal, to be used, may indicate the time of the recording, for example, in the form of Morse codes, teletype codes or the like, and indicating the time at which the particular signal is being recorded—for example, in spaced intervals if a plot of a course is desired.

The radar video signals are recorded on the recording medium, and may be reproduced in a number of separate indicators, for example, for classroom use, all being similar to indicator 118. Thus, the present invention is particularly applicable for navigation training, radar simulation, radar mapping and geographical analysis and surveys—additionally, as a record of operation of radar and scanning of specific terrain at a specific time, or for evaluation of operator or equipment performance and for trouble shooting.

We claim:

1. Recording system for radar signals in polar coordinate form, for recording and subsequent reproduction of signals received in a radar receiver comprising
   a video channel (102) deriving video signals from said radar receiver (101);
   a trigger pulse channel (103) deriving trigger pulses synchronized with video signals from said receiver;
   a mixer (104) mixing the signals from said video channel and said trigger pulse channels together;
   means (108–T1) recording said mixed signals derived from said mixer (104) on a first track (T1) of magnetic tape; and a bearing signal channel (105, 106, 107) deriving bearing (S1, S2, S3) and reference ($R_1$, $R_2$) signals from said receiver (101) representative of the instantaneous position of the radar antenna with respect to a reference; and means recording (108–T2) said bearing and reference signals on a second track of said magnetic tape.

2. Recording system according to claim 1 wherein said bearing signal channel is connected to receive, separately, two bearing signals ($S_{13}$ and $S_{23}$) and includes separate low-pass filters and phase responsive means (105, 106) deriving the envelopes of said bearing signals with respect to signals having said phase;
   and multiplex modulating means (107) to provide a single, multiple mixed signal for recording on the second track of said tape.

3. Recording system according to claim 2 including an additional signal channel (206, FIGURE 2) obtaining information signals from said radar receiver (101) said additional channel being connected to said multiplex modulating means (107) to multiple mix said information signal with said bearing signals.

4. Recording system according to claim 1 wherein range marker signals are mixed with said video signals, said range marker and video signals and trigger pulse signals being mixed in the respective mixer.

5. Recording system according to claim 1 wherein said radar receiver provides three bearing signals ($S_1$, $S_2$ $S_3$)

and phase reference signals ($R_1$, $R_2$) and said bearing signal channel includes two detector-low-pass filter amplifiers, each having two different ones of said bearing signals ($S_{13}$, $S_{23}$) and said phase reference signal ($R_1$, $R_2$) applied thereto, said detector-low-pass filter amplifiers delivering an envelope of said bearing signals;

a multiplex modulator (107) is provided, multiplexing the outputs of said band pass filter-amplifiers and modulating them on separate carriers, each modulated with a separate envelope corresponding to said bearing signals.

6. Recording system according to claim 5 including an audio frequency signal channel (AUX) connected to said radar receiver (101), the signals derived from said audio frequency signal channel being applied to said multiplex modulator (107), said multiplex modulator providing a mixed output including said additional audio frequency signals.

7. Reproducing system to reproduce signals recorded on two tracks of magnetic tape, said signals being mixed radar video and trigger pulse signals recorded on one track and mixed bearing and reference signals recorded on the other track, said system comprising a display reproducer (118);
means reading (108) said mixed video and trigger pulse signals on said first track (T1);
means separating (109) said read, mixed signals and having a separate output for said video, and said trigger signals, respectively,
means (110, 111, 112) applying said separate video and trigger signal output, respectively, to video and trigger signal inputs of said radar reproducer (118);
means (108) reading the bearing and reference signals recorded on the other track ($T_2$) of said tape;
means separating (113) said read, mixed signals and having a separate output for at least two bearing signals;
means demodulating (114, 115) each of said bearing signals to obtain an envelope signal, each;
and means (116, 117) applying said demodulated signals through the reference and bearing signal inputs of said reproducer (118).

8. Reproducing system according to claim 7 wherein said second track of said tape includes additional information signals, said separating means (113) having an additional output to separate said information signals;

and demodulator means (207) connected to said additional output and applying said output to said reproducer (118).

9. Reproducing system according to claim 7 wherein the signal recorded on the first track includes range marker information, the signal separator (109) separating a composite of said video signals and said range marker signals, said composite being applied to the video input of said reproducer.

10. Reproducing system according to claim 7 further including a synchro-resolver converter having the outputs of said demodulator means applied thereto to provide synchro-resolver type inputs to said radar reproducer (118).

11. Combination recording and reproducing system, for radar signals, comprising the reproducing system of claim 7 and the recording system of claim 1, said reproducing system reading the tape recorded by the recording system of claim 1.

References Cited
UNITED STATES PATENTS

| | | | |
|---|---|---|---|
| 3,181,139 | 4/1965 | Milroy | 343—5 |
| 3,354,438 | 11/1967 | Sandlin et al. | 343—5 X |

RODNEY D. BENNETT, JR., *Primary Examiner.*

CHARLES L. WHITHAM, *Assistant Examiner.*